US012802186B2

(12) United States Patent
Akutsu et al.

(10) Patent No.: US 12,802,186 B2
(45) Date of Patent: Nov. 17, 2026

(54) IMAGE CORRECTION METHOD AND IMAGE CORRECTION APPARATUS

(71) Applicant: SHIMADZU CORPORATION, Kyoto (JP)

(72) Inventors: Kei Akutsu, Kyoto (JP); Ryuji Sawada, Kyoto (JP); Kenta Adachi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 261 days.

(21) Appl. No.: 18/655,982

(22) Filed: May 6, 2024

(65) Prior Publication Data

US 2024/0412343 A1 Dec. 12, 2024

(30) Foreign Application Priority Data

Jun. 8, 2023 (JP) ................................ 2023-095079

(51) Int. Cl.
*G06T 5/90* (2024.01)
*G06T 5/50* (2006.01)

(52) U.S. Cl.
CPC . *G06T 5/90* (2024.01); *G06T 5/50* (2013.01)

(58) Field of Classification Search
CPC ... G06T 5/90; G06T 5/50; G06T 2207/10056; G06T 2207/30024; G06T 5/70; G06T 5/80; H04N 23/76
See application file for complete search history.

(56) References Cited

U.S. PATENT DOCUMENTS

| | | | | |
|---|---|---|---|---|
| 2014/0211034 A1* | 7/2014 | Tanaka | G06T 5/70 348/218.1 |
| 2015/0195453 A1* | 7/2015 | Saito | G06T 5/94 348/222.1 |
| 2019/0356869 A1* | 11/2019 | Qiu | G06T 5/50 |
| 2021/0133963 A1* | 5/2021 | Takahashi | G06V 10/454 |

FOREIGN PATENT DOCUMENTS

| | | | |
|---|---|---|---|
| JP | 2009129221 A * | 6/2009 | |
| WO | 2019/171546 A1 | 9/2019 | |
| WO | WO-2023008525 A1 * | 2/2023 | G06T 5/60 |

* cited by examiner

*Primary Examiner* — Jennifer Mehmood
*Assistant Examiner* — Vaisali Rao Koppolu
(74) *Attorney, Agent, or Firm* — Sughrue Mion, PLLC

(57) ABSTRACT

An image correction method according to this invention includes an image acquisition step, a background generation step of generating a plurality of background component images corresponding to different degrees of blurring in the object image, a selection step of selecting one background component image based on index values obtained based on the plurality of background component images, and an image correction step of generating a corrected object image based on the object image and the one background component image.

9 Claims, 8 Drawing Sheets

IMAGE CORRECTION METHOD AND IMAGE CORRECTION APPARATUS

CROSS-REFERENCE TO RELATED APPLICATIONS

The related application number JP2023-095079, Image Correction Method and Image Correction Apparatus, Jun. 8, 2023, Kei Akutsu, Ryuji Sawada, and Kenta Adachi, upon which this patent application is based are hereby incorporated by reference.

BACKGROUND OF THE INVENTION

Field of the Invention

The present invention relates to an image correction method and an image correction apparatus.

Description of the Background Art

Methods for analyzing a target object by acquiring an image of an object an image of which is captured are known. Such a method is disclosed, for example, in International Publication No. WO2019-171546.

The above International Publication No. WO2019-171546 discloses a cell image analysis method including a configuration in which images of cells cultivated on a cultivation plate are captured by an imaging device such as a microscope whereby acquiring object images.

Here, although not disclosed in the above Patent Document 1, in a case in which cells are cultivated in a cultivation plate (cultivation container), a height of a liquid surface of cultivation solution is increased toward a near-edge area of the cultivation container by surface tension. Such height variation of the liquid surface of the cultivation solution makes brightness of a background of an object image uneven. If the brightness of the background of the object image is uneven, to reduce brightness unevenness, it is necessary to change a degree (intensity) of correction depending on a size of the object and a degree of brightness unevenness in the image in order. For this reason, while an operator necessarily has a burden of specifying the degree of correction one by one, the degree of correction depends on experience of the operator who corrects the image. Consequently, it is desired for the image correction method to easily correct the image to reduce influence of brightness unevenness even if the brightness of the background of the object image is uneven.

SUMMARY OF THE INVENTION

The present invention is intended to solve the above problem, and one object of the present invention is to provide an image correction method capable of easily correcting, even if brightness of a background of an object image is uneven, the image to reduce influence of the brightness unevenness.

In order to attain the aforementioned object, an image correction method according to a first aspect of the present invention includes an image acquisition step of acquiring an object image including an object to be observed; a background generation step of applying a plurality of blurring processes to the object image acquired to reduce difference between brightness of the object and brightness of a part other than the object in the object image while changing a degree of blurring in each blurring process so as to generate a plurality of background component images corresponding to different degrees of blurring based on extraction of distribution of brightness components of a background from the object image; a selection step of selecting one of the background component images based on index values that indicate the degrees of blurring and are obtained based on the plurality of background component images generated in the background generation step; and an image correction step of correcting, based on the object image and the background component image selected, the object image to reduce brightness unevenness so as to generate a corrected object image.

An image correction apparatus according to a second aspect of the present invention includes an image acquirer configured to acquire an object image including an object to be observed; a background generator configured to apply a plurality of blurring processes to the object image acquired to reduce difference between brightness of the object and brightness of a part other than the object in the object image while changing a degree of blurring in each blurring process so as to generate a plurality of background component images corresponding to different degrees of blurring based on extraction of distribution of brightness components of a background from the object image; a selector configured to select one of the background component images based on index values that indicate the degrees of blurring and are obtained based on the plurality of background component images generated by the background generator; and an image corrector configured to correct, based on the object image and the background component image selected, the object image to reduce brightness unevenness so as to generate a corrected object image.

In the image correction method according to the first aspect and the image correction method apparatus according to the second aspect of the present invention, as discussed above, a background generation step of applying a plurality of blurring processes to the object image acquired to reduce difference between brightness of the object and brightness of a part other than the object in the object image while changing a degree of blurring in each blurring process so as to generate a plurality of background component images corresponding to different degrees of blurring based on extraction of distribution of brightness components of a background from the object image; and a selection step of selecting one of the background component images based on index values that indicate the degrees of blurring and are obtained based on the plurality of background component images generated in the background generation step are provided. Accordingly, because the background component image is automatically selected from the plurality of background component images based on index values that indicate the degrees of blurring and are obtained based on the plurality of background component images, the object image can be corrected based on the object image and the background component image selected. Consequently, it is possible to easily correct, even if brightness of a background of an object image is uneven, the image to reduce influence of the brightness unevenness.

DESCRIPTION OF THE PREFERRED EMBODIMENT

One embodiment embodying the present invention will be described with reference to the drawings.

Figure 1:
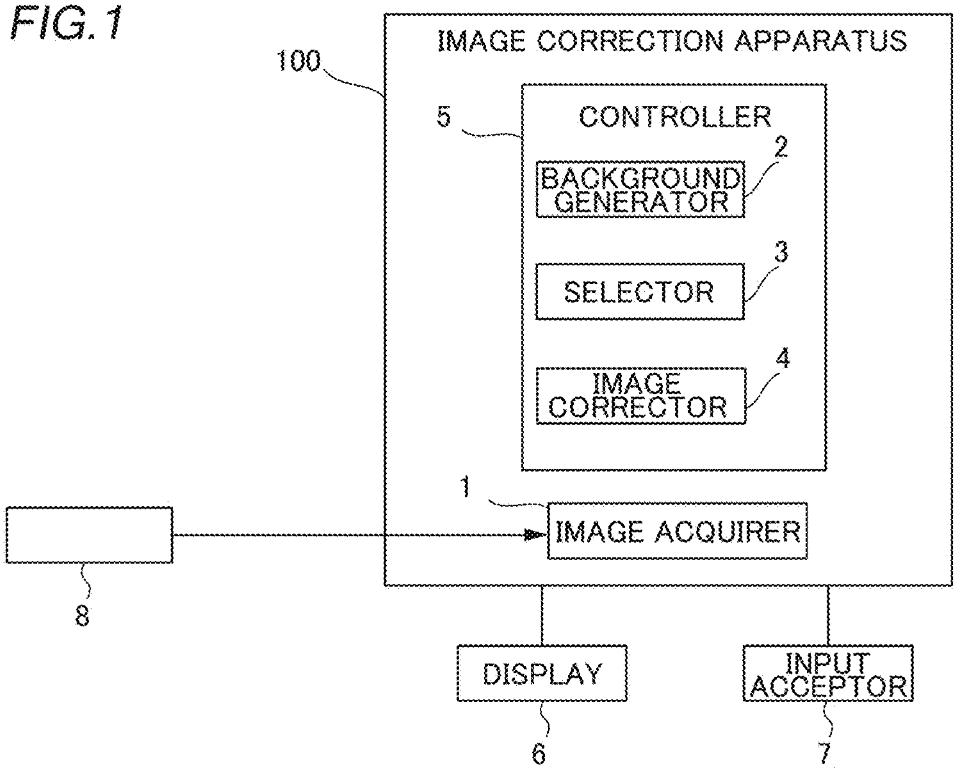
FIG. 1 is a schematic diagram showing the entire configuration of an image correction apparatus according to first to fourth embodiments.

The following description will describe an image correction method using an object image correction apparatus 100 according to the first embodiment with reference to FIG. 1.

(Configuration of Image Correction Apparatus)

The object image correction apparatus 100 includes an image acquirer 1, a controller 5 including a background generator 2, a selector 3 and an image corrector 4, a display 6, and an input acceptor 7 as shown in FIG. 1. The object image correction apparatus 100 is an example of an "image correction apparatus" in the claims.

The image acquirer 1 is configured to acquire an object image 10. In the first embodiment, the object image 10 is an image including cells 20 (see FIG. 2). Specifically, the object image 10 is an image including the cells 20 cultivated in a cultivation container 30 (see FIG. 3) filled with cultivation solution 31 (see FIG. 3). In the first embodiment, the image acquirer 1 is configured to acquire the object image 10 from a device that is configured to capture the object image 10 such as a microscope 8 to which an imaging apparatus is attached, for example. The image acquirer 1 includes an input/output interface, for example.

The background generator 2 is configured to generate a background component image 12 (see FIG. 7) that extracts a distribution of a brightness component of a background 21 (see FIG. 3) from the object image 10. The background generator 2 applies filtering (blurring) to the object image 10 to reduce difference between brightness of the cells 20 as a subject in the object image 10 and brightness of the background 21, which is a part other than an object. Also, the background generator 2 is configured to generate a plurality of background component images 12 by using a plurality of filters having different filter sizes when applying filtering to the object image 10. Processes of the background generator 2 for generating the background component image 12 will be described later.

The selector 3 is configured to select, based on index values that indicate degrees of blurring obtained based on brightness values of the plurality of background component images 12 generated by the background generator 2, one of the background component images 12 whose index value is smaller than a predetermined threshold from the plurality of background component images 12. Processes of the selector 3 for selecting one of the background component images 12 from the plurality of background component images 12 are described later.

The image corrector 4 is configured to correct, based on the object image 10 and the background component image 12 selected by the selector 3, the object image 10 to reduce brightness unevenness so as to generate a corrected object image 14. Processes of the image corrector 4 for generating the corrected object image 14 will be described later.

The controller 5 is configured to control the object image correction apparatus 100, and includes the background generator 2, the selector 3, and the image corrector 4, which are control blocks. The controller 5 includes a CPU (Central Processing Unit), a ROM (Read Only Memory), a RAM (Random Access Memory), a graphics processing unit (GPU), a field-programmable gate array (FPGA) configured for image processing, or the like as a processor. Also, the controller 5 is configured to direct the display 6 to display the object image 10, the corrected object image 14, and the like.

The display 6 is configured to display the object image 10 acquired by the image acquirer 1, and the corrected object image 14 generated by the image corrector 4. The display 6 includes a display device such as an LCD monitor, for example.

The input acceptor 7 is configured to accept operating inputs from a user. The input acceptor 7 includes an input device such as a computer mouse, keyboard, etc., for example.

(Object Image)

Figure 2:
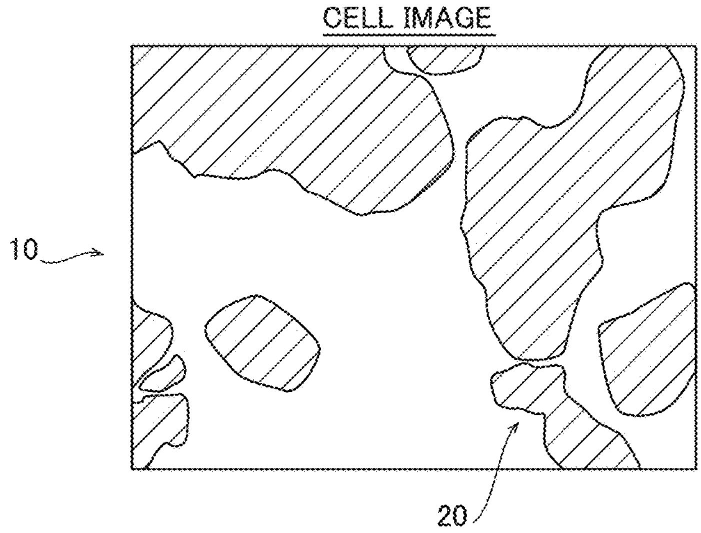
FIG. 2 is a schematic view illustrating an object image.

The object image 10 is described with reference to FIG. 2. In the first embodiment, the object image 10 is an image including the cells 20. In the first embodiment, the object image 10 is a microscopic image captured by the microscope 8 to which an imaging apparatus attached. The object image includes cells 20 that are able to differentiate (cell potency) as the cells 20. For example, the cells 20 include IPS cells (Induced Pluripotent Stem Cells), ES cells (Embryonic Stem cells), and the like.

(Unevenness of Brightness of Background Caused by Cultivation Solution)

Figure 3:
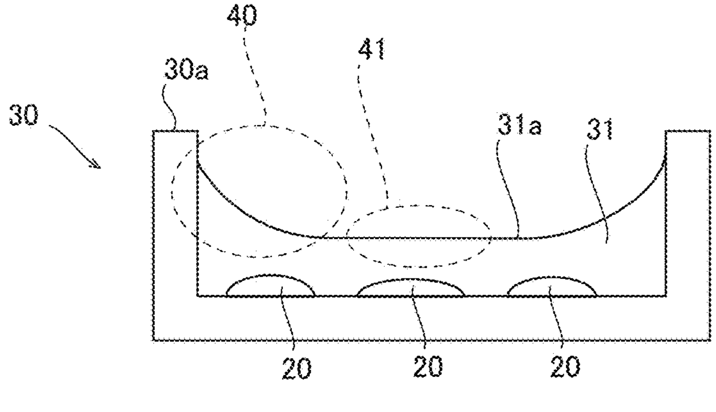
FIG. 3 is a schematic view illustrating unevenness of brightness of a background of the object image caused by cultivation solution with which a cultivation container is filled.
Figure 4:
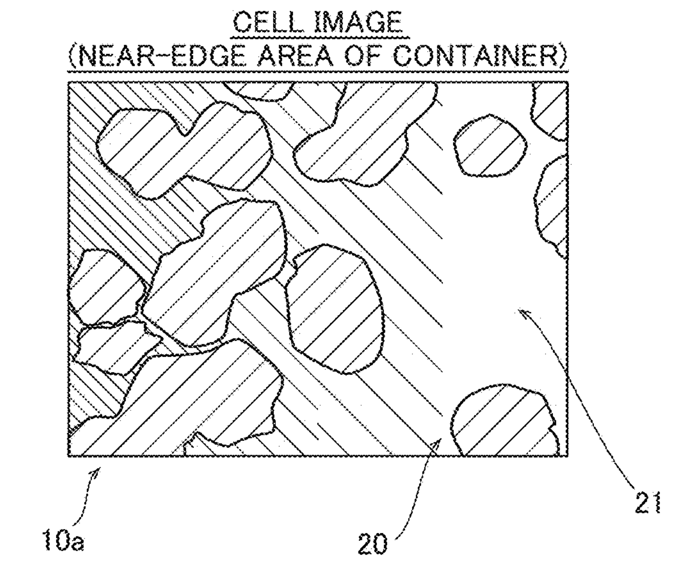
FIG. 4 shows a near-edge area of the cultivation container of an object image in which brightness unevenness appears in the background.
Figure 5:
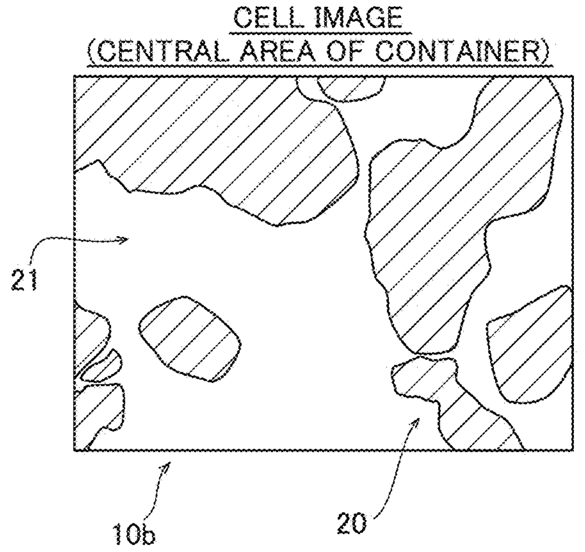
FIG. 5 shows a central area of the cultivation container of the object image in which brightness unevenness does not appear in the background.

The following description describes a case in which the cultivation solution 31 makes brightness of the background 21 of the object image 10 uneven with reference to FIGS. 3 to 5. In the first embodiment, the object image 10 includes an object image 10*a* (see FIG. 4) that has uneven brightness of the background 21, and an object image 10*b* (see FIG. 5) that has even brightness of the background 21.

As shown in FIG. 3, the cells 20 are cultivated in the cultivation container 30 filled with the cultivation solution 31. A height of a liquid surface 31*a* of the cultivation solution 31 gradually varies due to surface tension in a near-edge area 40 of the cultivation container 30. In an exemplary case shown in FIG. 3, the height of the liquid surface 31*a* of the cultivation solution 31 increases toward the edge 30*a* of the cultivation container 30. In this case, height difference of the cultivation solution 31 causes uneven brightness of the background 21 shown in the object image 10*a* of FIG. 4. The object image 10*a* includes the cells 20 that are located in the near-edge area 40 of the cultivation container 30. The uneven brightness of the background 21 of the object image 10*a* shown in FIG. 4 is represented by different hatching patterns. The object image 10*a* shown in FIG. 3 represents exemplary unevenness of brightness in which brightness values (pixel values) of the background 21 decrease from the left side to the right side of the image. The near-edge area 40 of the cultivation container 30 includes a position of the edge 30*a* of the cultivation container 30 and an area near the position of the edge 30*a* of the cultivation container 30.

As shown in FIG. 5, the height of the liquid surface 31*a* of the cultivation solution 31 is constant in a central part 41 of the cultivation container 30. In a case in which the height of the liquid surface 31*a* of the cultivation solution 31 is constant, brightness of the background 21 does not become uneven. In other words, as shown in the object image 10*b*, brightness of the background 21 is even in an image including the cells 20 that are located in the central part 41 of the cultivation container 30. The object image 10*b* includes only the cells 20 that are located in the central part 41 of the cultivation container 30.

(Processes of Image Correction method)

Processes of correcting the object image 10 in the image correction method according to the first embodiment is now described with reference to FIGS. 1 and 6 to 9.

Figure 6:
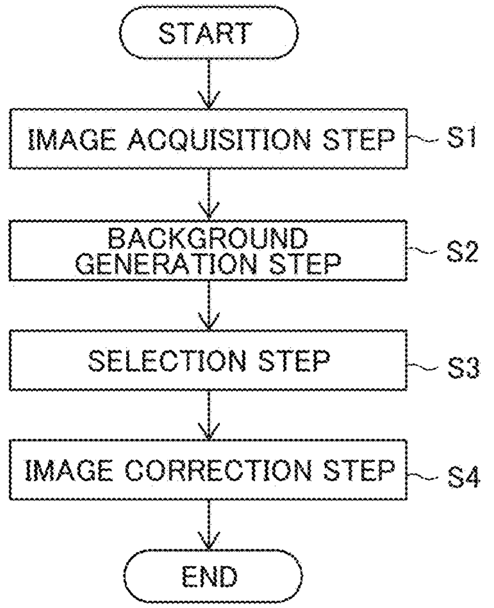
FIG. 6 is a flowchart illustrating processing of an image correction method according to the first embodiment.

The image correction method according to the first embodiment includes an image acquisition step S1, a background generation step S2, a selection step S3 and an image correction step S4 as shown in FIG. 6.

(Acquisition of Object Image)

In the first embodiment, the object image 10 is first acquired in step S1. Specifically, the image acquirer 1 acquires, through communication, the object image 10 captured by a microscope 8 or the like to which an imaging device is attached, for example. Subsequently, the procedure goes to step S2.

(Generation of Background Component Images)

Subsequently, in step S2, the background generator 2 acquires the background component images 12 from the object image 10*a*. Generation of the background component images 12 by the background generator 2 is now described with reference to FIG. 7. In the first embodiment, the background generator 2 generates the background component images 12 by extracting distributions of brightness components of the background 21 from the object image 10*a* by filtering the object image 10*a* acquired by the image acquirer 1. Specifically, the background generator 2 generates the background component images 12 by applying median filters to the object image 10*a*. In the first embodiment, the image is blurred by applying a median filter to reduce difference between brightness of the cells 20, which are subjects in the object image 10*a*, and brightness of the background 21, which is a part other than the cells 20 by the background generator 2.

In the filtering using the median filter, a median value of pixel values of pixels in an area (filter) of a predetermined size centering a target pixel is acquired. Specifically, in the filtering using the median filter, pixel values of pixels in a filter are acquired, and the acquired pixel values are sorted in increasing order so that a median value is acquired from the sorted pixel values. Then, the median value acquired is used as a pixel value of the target pixel. This filtering is applied to all the pixels of the object image 10*a* by changing the target pixel one by one. For this reason, the filtering using the median filter increases a load of processing.

Figure 7:
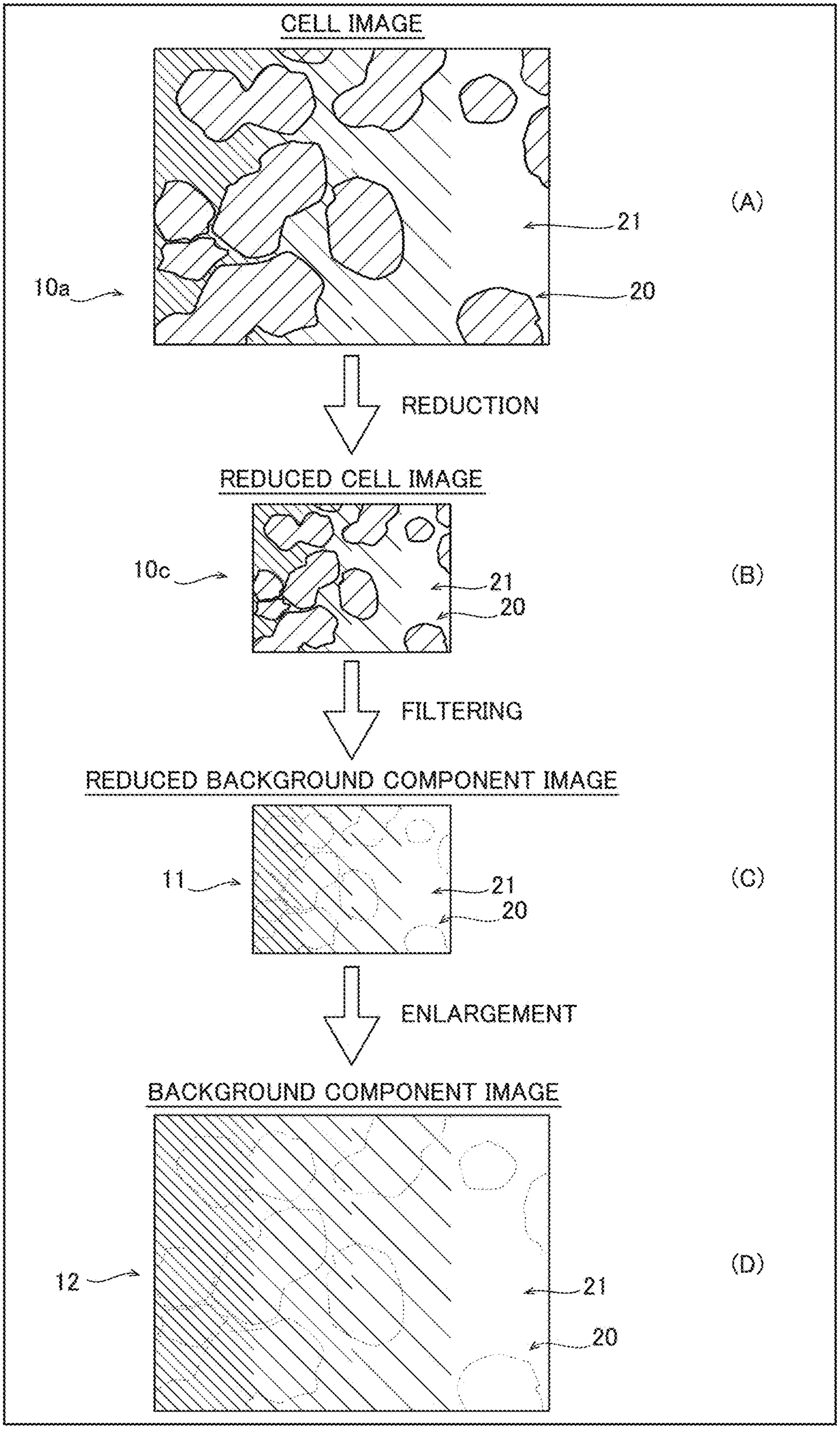
FIG. 7 is a schematic diagram illustrating processes of generating a background component image in the first to fourth embodiments.
Figure 8:
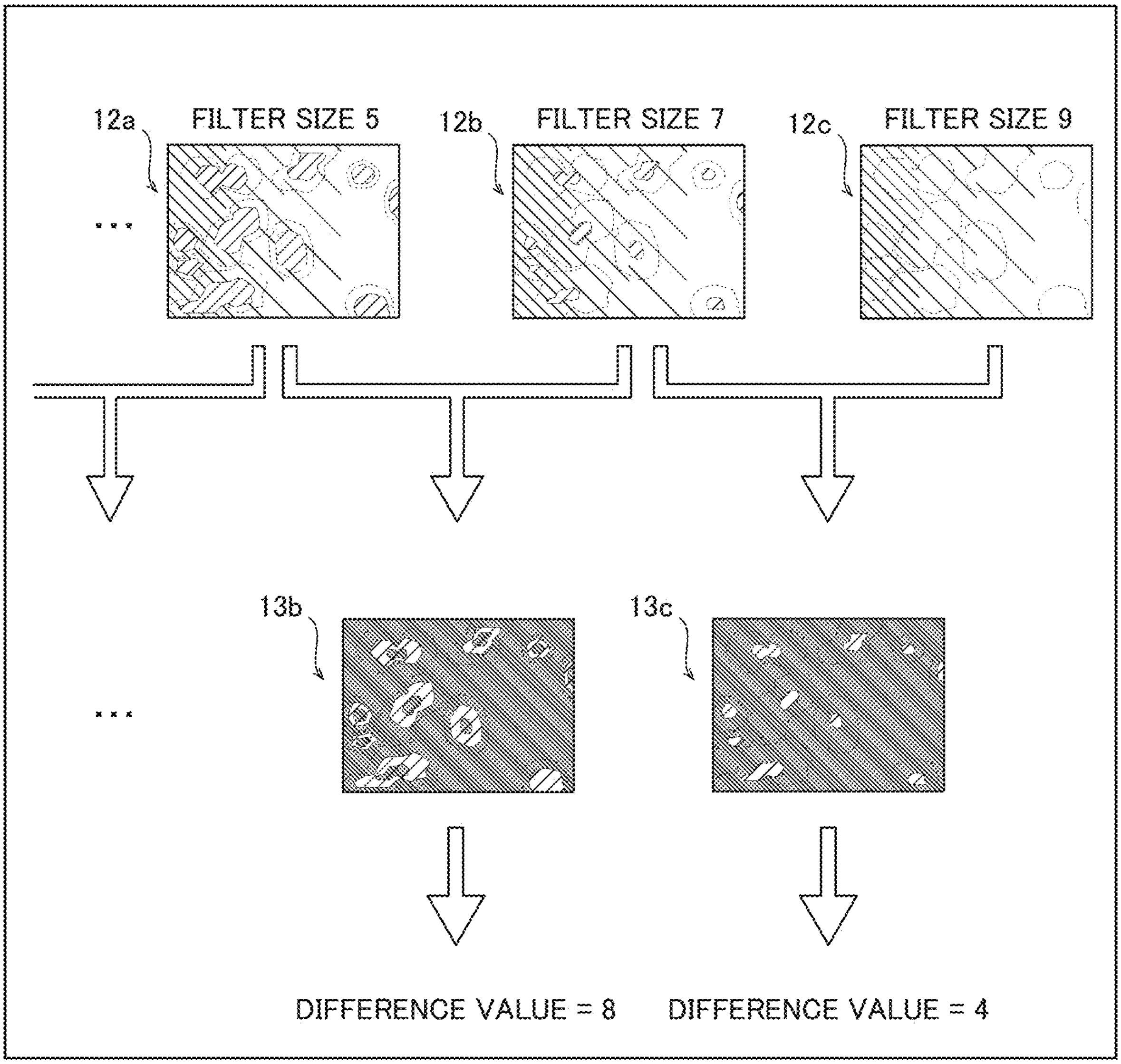
FIG. 8 is a schematic diagram illustrating processes of acquiring an index value based on difference images in the first embodiment.

To address, in the first embodiment, the background generator 2 (see FIG. 1) generates a reduced object image 10*c*, which is reduced as shown FIG. 7 at (B), by reducing the object image 10*a*, which has uneven brightness of the background 21 as shown in FIG. 7 at (A). Specifically, the background generator 2 generates the reduced object image 10*c* by applying lossless compression to the object image 10*a*. In the first embodiment, the background generator 2 reduces a size of the object image 10*a* by ⅛, for example, so as to generate the reduced object image 10*c*.

Subsequently, as shown in FIG. 7 at (C), the background generator 2 generates a reduced background component image 11 by filtering the reduced object image 10*c* after reduction. In the first embodiment, the background generator 2 applies a median filter to the reduced object image 10*c*, which is a reduced image acquired by reducing the object image 10*a*. The reduced background-component image 11 after reduction is an image that is generated by extracting unevenness of brightness (background component) of the background 21 by filtering. In the reduced background component image 11 after reduction, a position of the cells 20 in the object image 10*a* is represented by a dashed line. The reduced background component image 11 shown in FIG. 7 at (C) is illustratively blurred to an exemplary degree of blurring in which the cells 20 and the background 21 cannot be clearly distinguished.

Subsequently, as shown in FIG. 7 at (D), the background generator 2 generates the background component image 12 by enlarging the reduced background component image 11. Specifically, the background generator 2 enlarges the reduced background component image 11 so that a size of the background component image 12 is increased to the same size as the object image 10*a*. In the first embodiment, for example, the background generator 2 generates the background component image 12 by enlarging the reduced background component image 11 by 8 times, for example.

In the background generation step S2, a plurality of median filters having different filter sizes are applied to the reduced object image 10*c*. As a result, the background generator 2 generates a plurality of reduced background component images 11 and enlarges the plurality of reduced background component images 11 so as to generate a plurality of background component images 12. For example, in the first embodiment, a plurality of background component images 12*a* to 12*c* are acquired as shown in an upper part of FIG. 8. The degree of blurring (blurring intensity) can be increased as the filter size increases. Subsequently, the procedure goes to step S3.

(Selection of Background Component Image)

In step S3, the selector 3 selects one background component image 12*c* from the plurality of background component images 12*a* to 12*c*. A configuration of the background generator 2 that selects the background component image 12*c* is now described with reference to FIG. 8. The selector 3 acquires differences between brightness values of the plurality of background component images 12*a* to 12*c* generated by the background generator 2. In this case, differences between the brightness values of two of the background component images 12*a* to 12*c* whose blurring intensities are close to each other are acquired in the plurality of background component images 12*a* to 12*c* whose blurring intensities are different from each other due to the different filter sizes. Specifically, a difference image 13*b* is acquired by subtracting brightness values of one of the background component images 12*a* and 12*b* from brightness values of another background component image as difference. In addition, a difference image 13*c* is acquired by subtracting brightness values of one of two background component images 12*b* and 12*c* whose blurring intensities are close to each other from brightness values of another background component image as difference. The selector 3 is configured to select, based on index values that indicate degrees of blurring obtained based on all the acquired difference images 13 including the difference images 13*b* and 13*c* and are smaller than a predetermined threshold, one background component image 12*c*.

Specifically, average values of brightness values of the entire image are acquired for the difference images 13 acquired including the difference images 13*b* and 13*c*, and difference values are acquired as the index values. For example, as shown in FIG. 6, the difference value "8" is acquired from the difference image 13*b*, and the difference value "4" is acquired from the difference image 13*c*. Subsequently, if the difference value becomes smaller than the predetermined threshold, from the background component images 12*b* and 12*c*, which are used to generate the difference image 13*c*, the background component image 12*c* whose filter size is greater is selected. Although the predetermined threshold as a basis for the selection can be changed to an arbitrarily value by setting, the predetermined threshold is set "5" in the first embodiment. If two or more difference images 13 have a difference value smaller than the predetermined threshold, one of the background component images 12 is selected by using the difference image 13 whose difference value is the greatest and is smaller than the predetermined threshold. Subsequently, the procedure goes to step S4.

(Generation of Corrected Object Image)

Figure 9:
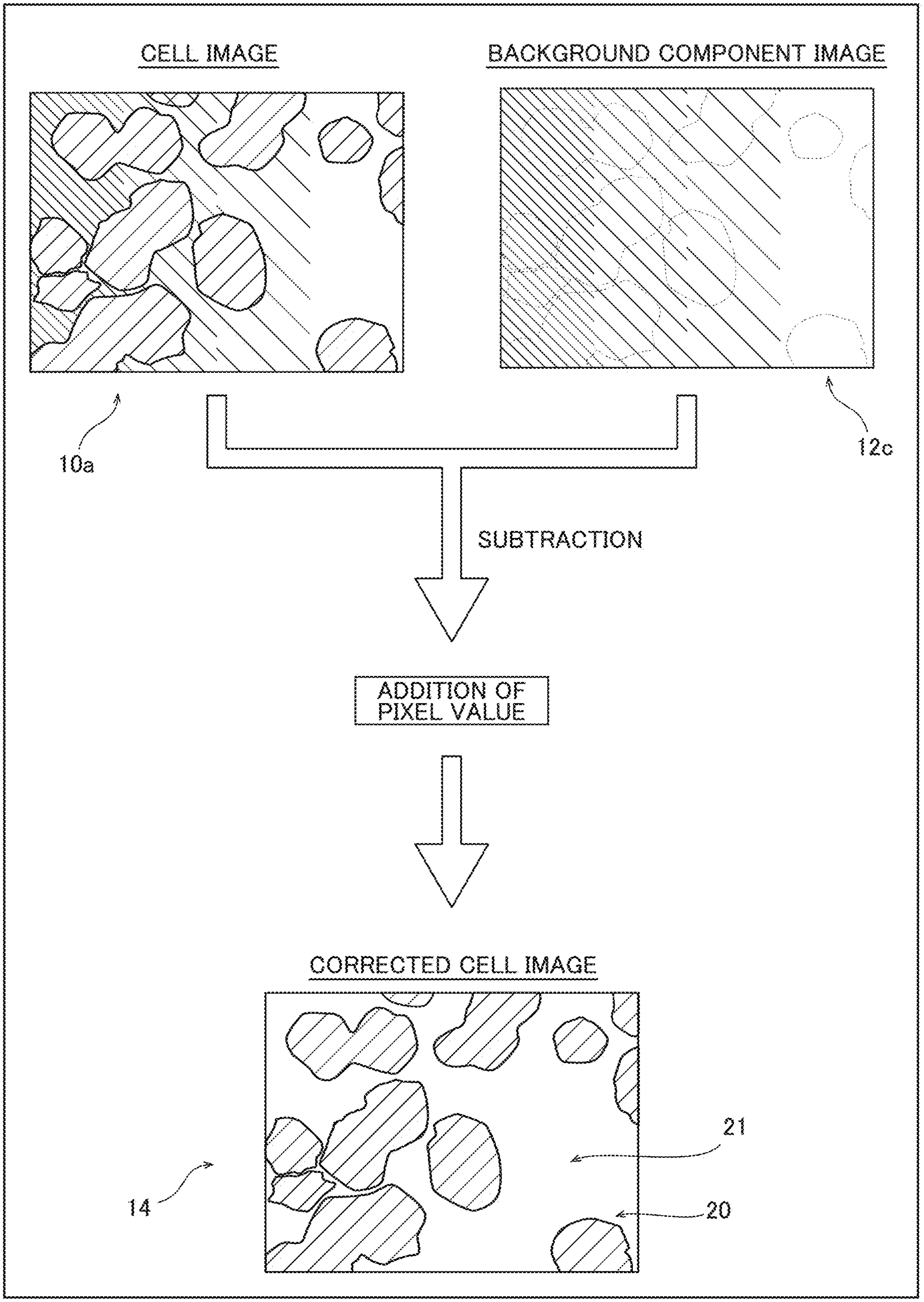
FIG. 9 is a schematic diagram illustrating processes of generating a corrected object image in the first to fourth embodiments.

In step S4, the image corrector 4 corrects, based on the object image 10*a* and the background component image 12*c* selected by the selector 3, the object image 10*a* to reduce brightness unevenness so as to generate the corrected object image 14. A configuration of generating the corrected object image 14 is now described with reference to FIG. 9. As shown in FIG. 9, the image corrector 4 subtracts the background component image 12*c* from the object image 10*a*. In a case in which the background component image 12*c* is subtracted from the object image 10*a*, pixel values of the entire image become smaller so that a contrast of the image can decrease in such a case. To address this, in the first embodiment, the image corrector 4 subtracts the background component image 12*c* from the object image 10*a*, and then adds a predetermined brightness value so as to generate the corrected object image 14. The predetermined pixel value is, for example, a half the gray-scale value of the pixel value of the object image 10*a*. In the first embodiment, for example, if the pixel value of the object image 10*a* is represented by a value of 256 levels of gray, the background generator 2 adds 128 as the predetermined pixel value.

As shown in FIG. 9, unevenness of brightness of the background 21 is reduced in the corrected object image 14. The background 21 without hatching pattern in the corrected object image 14 shown in FIG. 9 represents the reduction of unevenness of brightness of the background 21.

As described above, even if the object image 10*a* has brightness unevenness, the object image correction apparatus 100 can acquire the corrected object image 14 in which brightness unevenness is reduced by selecting the appropriate background component image 12*c* and correcting the image.

Advantages of the Embodiment

The image correction method according to the first embodiment includes an image acquisition step S1 of acquiring an object image 10*a* including cells 20 to be observed; a background generation step S2 of applying a plurality of blurring processes to the object image 10*a* acquired to reduce difference between the brightness of the cells 20 in the object image 10*a* and the brightness of a background 21, which is a part other than the cells 20, while changing a degree of blurring in each blurring process so as to generate a plurality of background component images 12*a* to 12*c* corresponding to different degrees of blurring based on extraction of distribution of brightness components of the background 21 from the object image 10*a*; a selection step S3 of selecting one background component image 12*c* based on index values that indicate the degrees of blurring and are obtained based on the plurality of background component images 12*a* to 12*c* generated in the background generation step S2; and an image correction step S4 of correcting, based on the object image 10*a* and the background component image 12*c* selected, the object image 10*a* to reduce brightness unevenness so as to generate a corrected object image 14. Accordingly, because the background component image 12*c* is automatically selected from the plurality of background component images 12*a* to 12*c* based on index values that indicate the degrees of blurring and are obtained based on the background component image 12*c*, the object image 10*a* can be corrected based on the object image 10*a* and the background component image 12*c* selected. Consequently, it is possible to easily correct, even if brightness of the background 21 of the object image 10*a* is uneven, the image to reduce influence of the brightness unevenness.

In addition, in the first embodiment, the index values are acquired based on brightness values of the plurality of background component images 12*a* to 12*c*; and the selection step S3 selects one background component image 12*c* whose index value is smaller than a predetermined threshold in the plurality of background component images 12*a* to 12*c* generated in the background generation step S2. Accordingly, it is possible to automatically select the background component image 12*c* whose index value, which is one of the index values acquired based on brightness values of the plurality of background component images 12*a* to 12*c*, is smaller than the predetermined threshold. That is, because the background component image 12*c*, which is subjected to sufficient blurring, is automatically selected, the object image 10*a* can be corrected based on the object image 10*a* and the background component image 12*c*, which is selected as the background component image subjected to sufficient blurring. Consequently, it is possible to easily and appropriately correct the object image 10*a* to reduce influence of the brightness unevenness.

In addition, in the first embodiment, the selection step S3 selects, if two or more of the index values are smaller than the predetermined threshold, one background component image 12*c* whose index value is the greatest value in two or more of the background component images 12*a* to 12*c* whose index values are smaller than the predetermined threshold and that are generated in the background generation step S2. Consequently, it is possible to select the more appropriate background component image 12*c* even if background component images that correspond to two or more of the index values smaller than the predetermined threshold are acquired. Here, because the background component image 12 that corresponds to the greatest index value in the index values that are smaller than the predetermined threshold is subjected to a smaller degree of blurring as compared with the background component images 12 that correspond other index values that are smaller than the predetermined threshold, a brightness value of the background component image 12 generated based on the object image 10*a* can be close to a brightness value of the background 21 in the object image 10*a*. Accordingly, because the background component image 12 that corresponds to the greatest index value in the index values that are smaller than the predetermined threshold is selected, it is possible to prevent that the brightness value of the background component image 12 generated based on the object image 10*a* becomes far from the brightness value of the background 21 in the object image 10*a*. Consequently, it is possible to more appropriately select the background component image 12 to be used to correct the object image 10*a* to reduce influence of the brightness unevenness.

In addition, in the first embodiment, in the image correction method that includes the selection step selects one of the background component images 12*a* to 12*c* whose index value is smaller than a predetermined threshold, it is preferable that the selection step S3 generates difference images 13*a* to 13*c* based on two of the background component images 12*a* to 12*c* whose degrees of blurring are close to each other in the plurality of background component images 12*a* to 12*c* corresponding to the different degrees of blurring, acquires difference values as the index values based on the difference images 13, and selects one background component image 12*c* that is used to generate the difference image 13*c* whose difference value is smaller than a predetermined difference value threshold. Accordingly, because the background component image 12*c* whose difference value, which is a quantitative value based on brightness values of the plurality of background component images 12*a* to 12*c*, is smaller than the predetermined difference value threshold is automatically selected, the object image 10*a* can be corrected based on the object image 10*a* and the background component image 12*c* corresponding to the difference image 13*c* whose difference value is smaller. Consequently, it is possible to easily and appropriately correct the object image 10 to reduce influence of the brightness unevenness by using the background component image 12*c* automatically selected based on the difference values.

In addition, in the first embodiment, the blurring processes are filtering processes of applying a filter to the object image 10*a* for correction of the object image, and the plurality of background component images 12*a* to 12*c* corresponding to different degrees of blurring are generated by a plurality of changes of a filter size for changing the degree of blurring. Accordingly, it is possible to generate the plurality of background component image 12*a* to 12*c* corresponding to different degrees of blurring depending on the filter sizes. Consequently, it is possible to correct the object image 10*a* to reduce influence of brightness unevenness by using the background component image 12*c* selected from the plurality of background component images 12*a* to 12*c* generated depending on the filter sizes.

In addition, in the first embodiment, the filter used in the background generation step S2 is a median filter, and the plurality of background component images 12*a* to 12*c* are generated from the object image 10*a* by using the median filter. Here, in a case in which a Gaussian filter or an averaging filter is applied as the filtering, for example, stray light that causes extremely high pixel values or foreign objects that cause extremely low brightness values can prevent accurate acquisition of a brightness component of the background 21 in some cases. To address this, a median filter, which uses a median value of brightness values for each pixel in a predetermined area for smoothing, is applied so that background component images 12 whose background 21 brightness component is accurately acquired can be acquired even in a case in which the background includes such stray light or foreign objects. Consequently, because brightness unevenness of the background 21 can be corrected based on the accurate background component image 12*c*, it is possible to acquire the corrected object image 14, which accurately corrects the unevenness of brightness of the background 21.

Second Embodiment

An image correction method according to a second embodiment is now described. An apparatus configuration of an object image correction apparatus 100 used in the image correction method according to the second embodiment is similar to the object image correction apparatus 100 shown in FIG. 1. The following description describes the selector 3 that applies differentiation to brightness values of the plurality of background component images 12*a* to 12*c* in a selection step S3*a* shown in FIG. 10 in the second embodiment. Description of the same configurations in the second embodiment as those of the first embodiment is omitted.

Figure 10:
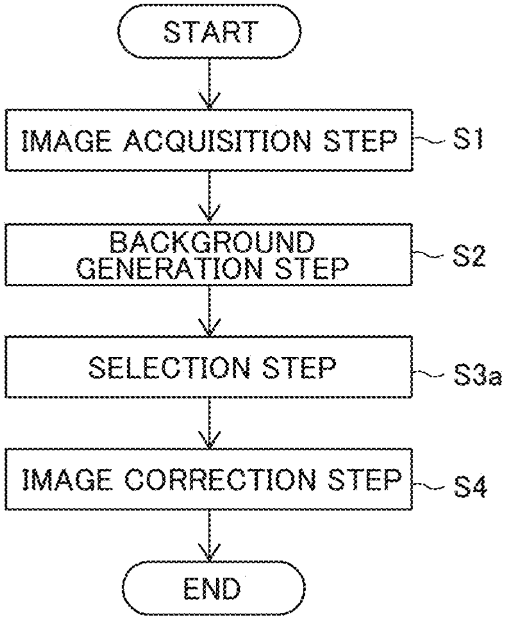
FIG. 10 is a flowchart illustrating processing of an image correction method according to the second embodiment.
Figure 11:
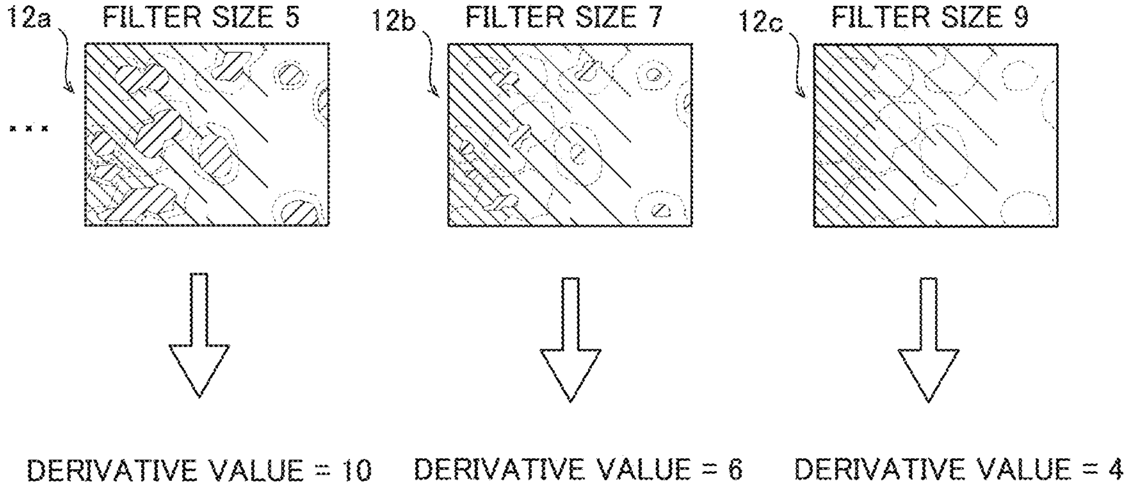
FIG. 11 is a schematic diagram illustrating processes of generating a background component image based on derivative values in the second embodiment.

In the second embodiment, in step S3*a* shown in FIG. 10, the selector 3 is configured to apply differentiation to brightness values of the plurality of background component images 12*a* to 12*c* generated by the background generator 2. Specifically, as shown in FIG. 11, Sobel filters (exemplary differential filters) are applied in two directions, which are vertical and horizontal directions of an image, to the brightness values of the background component images 12*a* to 12*c*, and derivative images are acquired to acquire average values of the brightness values of the derivative images as derivative values. For example, in the second embodiment, the derivative value acquired from the background component image 12*a* is “10”, the derivative value acquired from the background component image 12*b* is “6”, and the derivative value acquired from the background component image 12*c* is “4”. Although the predetermined threshold as a basis for the selection can be changed to an arbitrarily value by setting, the predetermined threshold is set “5” in the second embodiment. If the derivative value becomes smaller than the predetermined threshold “5”, the background component image 12*c* that is used to acquire the derivative value that becomes smaller than the predetermined threshold is selected. Subsequently, the procedure goes to step S4 in which the corrected object image 14 is generated.

Advantages of Second Embodiment

Advantages of the second embodiment are now discussed.

In the image correction method according to the second embodiment, the selection step S3*a* acquires derivative values as the index values based on brightness values of the plurality of background component images 12*a* to 12*c* corresponding to the different degrees of blurring, and selects one background component image 12*c* whose derivative value is smaller than a predetermined derivative value threshold. Accordingly, because the background component image 12_c_ whose derivative value, which is a quantitative value based on brightness values of the plurality of background component images 12_a_ to 12_c_, is smaller than the predetermined derivative value threshold is automatically selected, the object image 10_a_ can be corrected based on the object image 10_a_ and the selected background component image 12_c_ whose derivative value is smaller. Consequently, it is possible to easily and appropriately correct the object image 10_a_ to reduce influence of the brightness unevenness by using the background component image 12_c_ automatically selected based on the derivative values.

The other advantages of the second embodiment are similar to the first embodiment.

Third Embodiment

An image correction method according to a third embodiment is now described. An apparatus configuration of an object image correction apparatus 100 used in the image correction method according to the third embodiment is similar to the object image correction apparatus 100 shown in FIG. 1. The following description describes the selector 3 that acquires standard deviation values of brightness values of the plurality of background component images 12_a_ to 12_c_ in a selection step S3_b_ shown in FIG. 12 in the third embodiment. Description of the same configurations in the third embodiment as those of the first and second embodiments is omitted.

Figure 12:
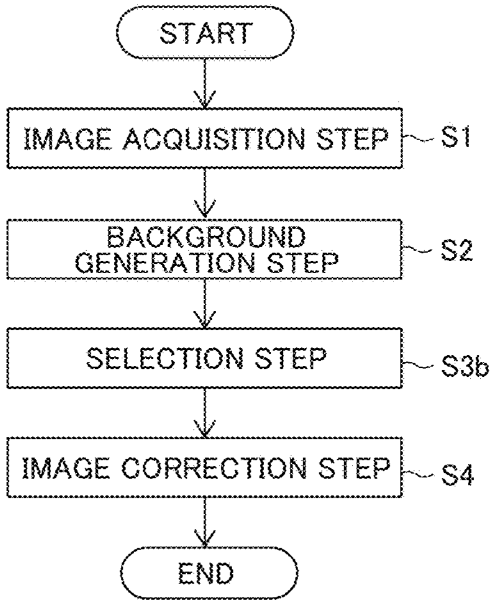
FIG. 12 is a flowchart illustrating processing of an image correction method according to the third embodiment.
Figure 13:
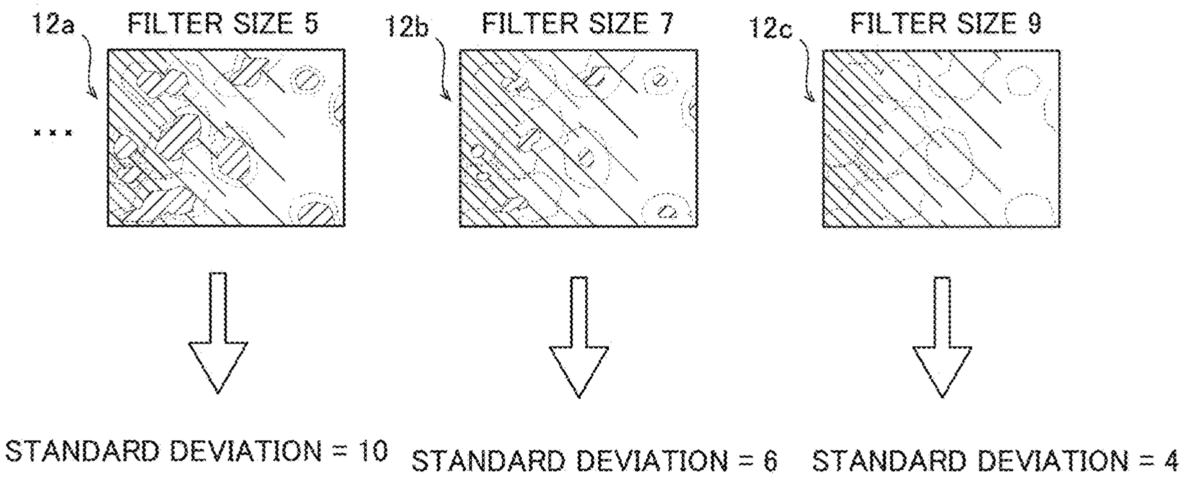
FIG. 13 is a schematic diagram illustrating processes of generating a background component image based on standard deviations in the third embodiment.

In the third embodiment, in step S3_b_ shown in FIG. 12, the selector 3 acquires standard deviation values of brightness values of the plurality of background component images 12_a_ to 12_c_ generated by the background generator 2 as shown in FIG. 13. Specifically, the standard deviations are acquired by substituting the brightness values of the background component image 12_a_ to 12_c_ into the following Equation. In the following Equation, an image size is M×N, src(i, j) is the brightness value at a position (i, j) of the image, and p is an average of the brightness values.

$$\sigma^2 = \frac{1}{MN}\sum\nolimits_{i=0}^{N-1}\sum\nolimits_{j=0}^{M-1}(src(i, J) - \mu)^2$$

For example, in the third embodiment, the standard deviation acquired from the background component image 12_a_ is "10", the standard deviation acquired from the background component image 12_b_ is "6", and the standard deviation acquired from the background component image 12_c_ is "4". Although the predetermined threshold as a basis for the selection can be changed to an arbitrarily value by setting, the predetermined threshold is set "5" in the third embodiment. If the standard deviation value becomes smaller than the predetermined standard deviation value threshold "5", the background component image 12_c_ that is used to acquire the standard deviation value that becomes smaller than the predetermined threshold is selected. Subsequently, the procedure goes to step S4 in which the corrected object image 14 is generated.

Advantages of Third Embodiment

Advantages of the third embodiment are now discussed.

In the image correction method according to the third embodiment, the selection step S3_b_ acquires standard deviations as the index values based on brightness values of the plurality of background component images 12_a_ to 12_c_ corresponding to the different degrees of blurring, and selects one background component image 12_c_ whose standard deviation is smaller than a predetermined threshold. Accordingly, because the background component image 12_c_ whose standard deviation, which is a quantitative value based on brightness values of the plurality of background component images 12_a_ to 12_c_, is smaller than the predetermined standard deviation threshold is automatically selected, the object image 10_a_ can be corrected based on the object image 10_a_ and the selected background component image 12_c_ whose standard deviation is smaller. Consequently, it is possible to easily and appropriately correct the object image 10_a_ to reduce influence of the brightness unevenness by using the background component image 12_c_ automatically selected based on the standard deviations.

The other advantages of the third embodiment are similar to the first and second embodiments.

Fourth Embodiment

An image correction method according to a fourth embodiment is now described. An apparatus configuration of an object image correction apparatus 100 used in the image correction method according to the fourth embodiment is similar to the object image correction apparatus 100 shown in FIG. 1. The following description describes the selector 3 that generates power spectrum images 15_a_ to 15_c_ based on brightness values of the plurality of background component images 12_a_ to 12_c_, and selects one background component image 12_c_ by using specific values as index values based on the power spectrum images 15_a_ to 15_c_ in a selection step S3_c_ shown in FIG. 14 in the fourth embodiment. Description of the same configurations in the fourth embodiment as those of the first to third embodiments is omitted.

Figure 14:
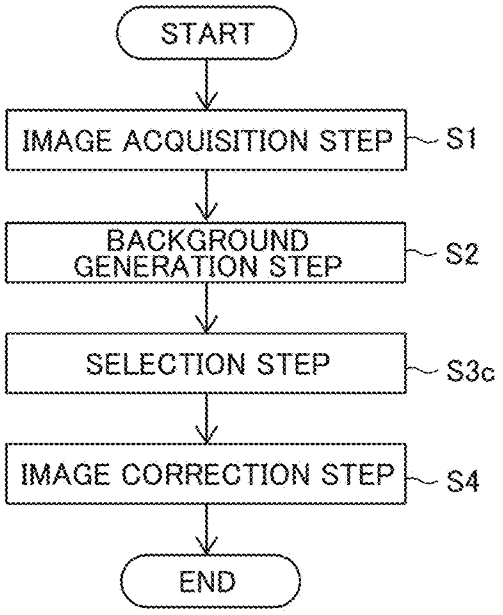
FIG. 14 is a flowchart illustrating processing of an image correction method according to the fourth embodiment.
Figure 15:
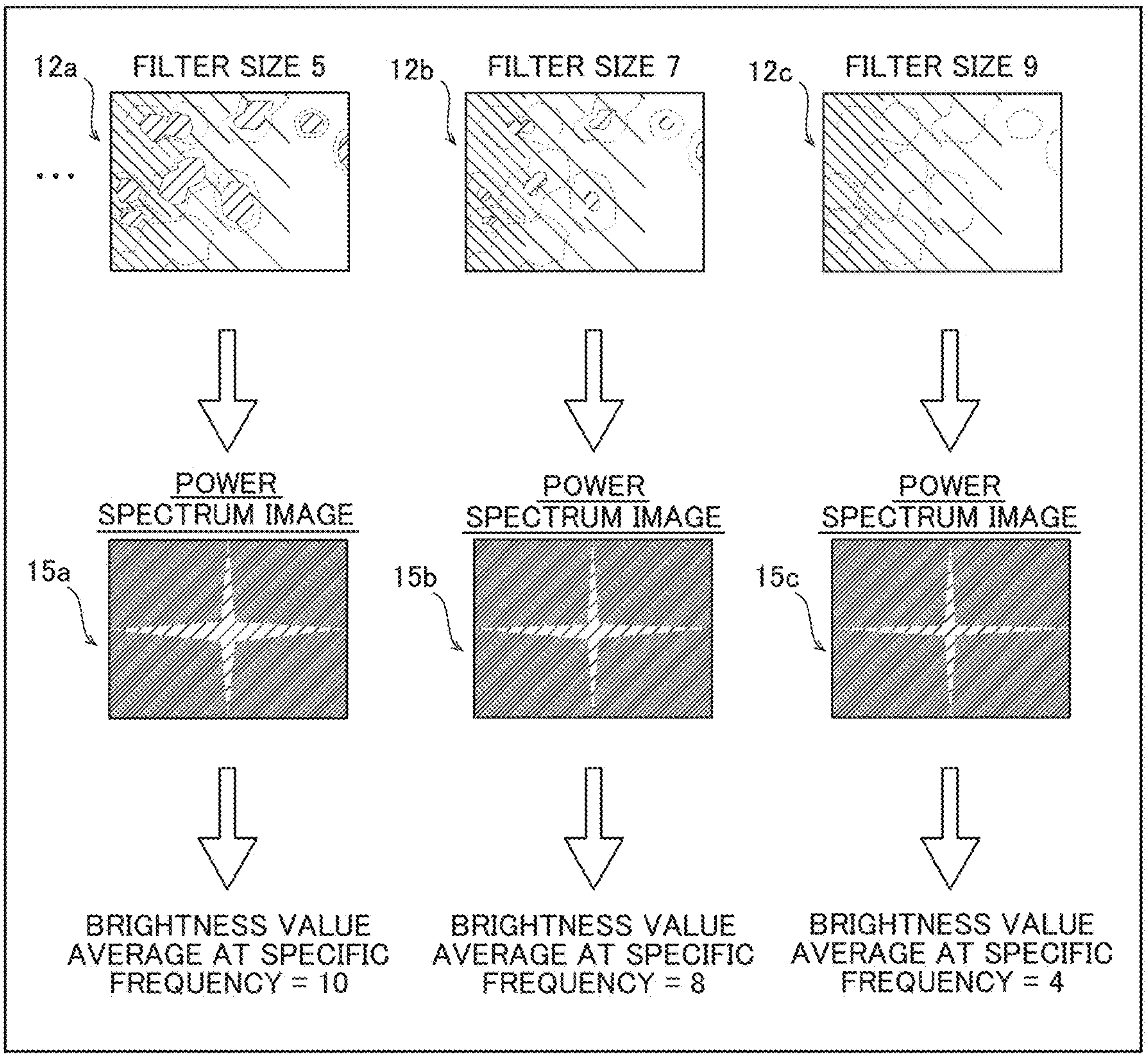
FIG. 15 is a schematic diagram illustrating configuration of acquiring an index value based on power spectrum images in the fourth embodiment.

In the fourth embodiment, in step S3_c_ shown in FIG. 14, the selector 3 applies Fourier transform to the plurality of background component images 12_a_ to 12_c_ generated by the background generator 2 to acquire the power spectrum images 15_a_ to 15_c_ as shown in FIG. 15. The power spectrum images 15_a_ to 15_c_ are images in which both a vertical y-axis and a horizontal x-axis of the image are represented by frequency. The selector 3 acquires the specific values each of which is an average of brightness values on a circumference corresponding to a specific frequency for the power spectrum images 15_a_ to 15_c_. For example, in the fourth embodiment, the specific value acquired from the power spectrum image 15_a_ is "10", the specific value acquired from the power spectrum image 15_b_ is "6", and the specific value acquired from the power spectrum image 15_c_ is "4". Although the predetermined threshold as a basis for the selection can be changed to an arbitrarily value by setting, the predetermined threshold is set "5" in the fourth embodiment. If the specific value becomes smaller than the predetermined threshold "5", the background component image 12_c_ that is used to acquire the specific value that becomes smaller than the predetermined threshold is selected. Subsequently, the procedure goes to step S4 in which the corrected object image 14 is generated.

Advantages of Fourth Embodiment

Advantages of the fourth embodiment are now discussed.

In the image correction method according to the fourth embodiment, the selection step S3_c_ applies Fourier transform to the plurality of background component images 12_a_ to 12_c_ corresponding to the different degrees of blurring so as to generate power spectrum images 15_a_ to 15_c_ representing intensities of spectrums based on frequency components, acquires specific values that are averages of the brightness values in a specific frequency of the power spectrum images 15*a* to 15*c* as the index values, and selects one background component image 12*c* that is used to generate the power spectrum image 15*c* whose specific value is smaller than a predetermined specific threshold. Accordingly, because the background component image 12*c* whose specific value, which is a quantitative value based on brightness values of the plurality of background component images 12*a* to 12*c*, is smaller than the predetermined specific value threshold is automatically selected, the object image 10*a* can be corrected based on the object image 10*a* and the background component image 12*c* selected. Consequently, it is possible to easily and appropriately correct the object image 10*a* to reduce influence of the brightness unevenness by using the background component image 12*c* automatically selected based on the specific values.

The other advantages of the fourth embodiment are similar to the first to third embodiments.

Modified Embodiments

Note that the embodiment disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

While the example in which the object included in the object image 10 is the cells 20 has been shown in the aforementioned first to fourth embodiments, the present invention is not limited to this. Alternatively, an object image 10*a* including any object to be observed can be acquired, and the corrected object image 14 can be generated.

While the example in which the image acquirer 1 is configured to acquire the object image 10 has been shown in the aforementioned first to fourth embodiments, the present invention is not limited to this. For example, alternatively, the background generator 2 can be configured to acquire the object image 10 which has been previously acquired by the image acquirer 1 and stored in a storage (not shown).

While the example in which the object image 10 is an image captured by the microscope 8 has been shown in the aforementioned first to fourth embodiments, the present invention is not limited to this. Alternatively, the object image 10 can be an image as long as it includes an object, for example, can be an image acquired by using SPM (Scanning Probe Microscope). Even in a case in which an image is acquired by using SPM, for example, if a stage on which cells 20 are placed is inclined, the object image 10 will have uneven brightness similar to the object image 10*a* shown in FIG. 4, and the image correction method of the present invention is effectively applied the image acquired by using SPM.

While the example in which each selection step S3, S3*a* to S3*c* selects one background component image 12*c* whose index value is smaller than a predetermined threshold in the plurality of background component images 12*a* to 12*c* generated in the background generation step S2 has been shown in the aforementioned first to fourth embodiments, the present invention is not limited to this. Alternatively, the selection step S3 can select one background component image 12 whose index value equal to a predetermined threshold in the plurality of background component images 12 generated in the background generation step S2.

While the example in which three background component images 12*a* to 12*c* are generated by blurring by using filters having different sizes has been shown in the aforementioned first to fourth embodiments, the present invention is not limited to this. The number of background component images 12 to be generated can be not smaller than two, and a number of filters having different sizes can be used for blurring depending on the number of background component images 12 to be generated.

While the example in which the background generator 2 generates the background component images 12 by applying median filters to the object image 10*a* has been shown in the aforementioned first to fourth embodiments, the present invention is not limited to this. For example, alternatively, the background generator 2 can be configured to generate the background component images 12 by applying Gaussian filters or averaging filters to the object image 10*a*. However, in a case in which the background generator 2 generates the background component images 12 by applying Gaussian filters or averaging filters, stray light that causes extremely high pixel values or foreign objects that cause extremely low pixel values can prevent accurate acquisition of a brightness component of the background 21 in some cases. For this reason, the background generator 2 is preferably configured to generate the background component images 12 by applying median filters to the object image.

While the example in which the background generator 2 generates the background component images 12 by reducing the object image 10*a* and by filtering the reduced object image 10*c* after the reduction has been shown in the aforementioned first to fourth embodiments, the present invention is not limited to this. Alternatively, the background generator 2 can be configured to generate the background component images 12 by blurring the object image 10*a* without reducing the object image 10*a*.

While the example in which the background generator 2 generates the corrected object image 14 by correcting the object image 10*a* that has brightness unevenness of the background 21 has been shown in the aforementioned first to fourth embodiments, the present invention is not limited to this. Alternatively, the background generator 2 can be configured to correct the object image 10*a* irrespective of whether the object image has brightness unevenness of the background 21 or not.

While the example in which the background generator 2 subtracts the background component images 12 from the object image 10*a* so as to generate the corrected object image 14 has been shown in the aforementioned first to fourth embodiments, the present invention is not limited to this. For example, alternatively, the background generator 2 can divide the object image 10*a* by the background component images 12 so as to generate the corrected object image 14. The background generator 2 can use any technique to generate the corrected object image 14.

While the example in which the background generator 2 subtracts the background component images 12 from the object image 10*a* and adds the predetermined brightness value so as to generate the corrected object image 14 has been shown in the aforementioned first to fourth embodiments, the present invention is not limited to this. For example, alternatively, the background generator 2 can be configured to subtract the background component images 12 from the object image 10 so as to generate the corrected object image 14 without adding the predetermined brightness value.

Modes

The aforementioned exemplary embodiment will be understood as concrete examples of the following modes by those skilled in the art.

(Mode Item 1)

An image correction method according to mode item 1 includes an image acquisition step of acquiring an object image including an object to be observed; a background generation step of applying a plurality of blurring processes to the object image acquired to reduce difference between brightness of the object and brightness of a part other than the object in the object image while changing a degree of blurring in each blurring process so as to generate a plurality of background component images corresponding to different degrees of blurring based on extraction of distribution of brightness components of a background from the object image; a selection step of selecting one of the background component images based on index values that indicate the degrees of blurring and are obtained based on the plurality of background component images generated in the background generation step; and an image correction step of correcting, based on the object image and the background component image selected, the object image to reduce brightness unevenness so as to generate a corrected object image.

(Mode Item 2)

In the image correction method according to mode item 1, the index values are acquired based on brightness values of the plurality of background component images; and the selection step selects one of the background component images whose index value is smaller than a predetermined threshold in the plurality of background component images generated in the background generation step.

(Mode Item 3)

In the image correction method according to mode item 2, the selection step selects, if two or more of the index values are smaller than the predetermined threshold, one of the background component images whose index value is the greatest value in the two or more background component images whose index values are smaller than the predetermined threshold and that are generated in the background generation step.

(Mode Item 4)

In the image correction method according to mode item 2, the selection step generates difference images of brightness values based on two background component images whose degrees of blurring are close to each other in the plurality of background component images corresponding to the different degrees of blurring, acquires difference values as the index values based on the difference images, and selects one of the background component images that is used to generate the difference image whose difference value is smaller than a predetermined difference value threshold.

(Mode Item 5)

In the image correction method according to mode item 2, the selection step acquires derivative values as the index values based on brightness values of the plurality of background component images corresponding to the different degrees of blurring, and selects one of the background component images whose derivative value is smaller than a predetermined derivative value threshold.

(Mode Item 6)

In the image correction method according to mode item 2, the selection step acquires standard deviations as the index values based on brightness values of the plurality of background component images corresponding to the different degrees of blurring, and selects one of the background component images whose standard deviation is smaller than a predetermined standard deviation threshold.

(Mode Item 7)

In the image correction method according to mode item 2, the selection step applies Fourier transform to the plurality of background component images corresponding to the different degrees of blurring so as to generate power spectrum images representing intensities of spectrums based on frequency components, acquires specific values that are averages of brightness values in a specific frequency of the power spectrum images as the index values, and selects one of the background component images that is used to generate the power spectrum image whose specific value is smaller than a predetermined specific value threshold.

(Mode Item 8)

In the image correction method according to mode item 1, the blurring processes are filtering processes of applying a filter to the object image for correction of the object image, and the plurality of background component images corresponding to different degrees of blurring are generated by a plurality of changes of a filter size for changing the degree of blurring.

(Mode Item 9)

In the image correction method according to mode item 8, the filter used in the background generation step is a median filter, and the plurality of background component images are generated by extracting the background component images from the object image by using the median filter.

(Mode Item 10)

An image correction apparatus according to mode item 10 includes an image acquirer configured to acquire an object image including an object to be observed; a background generator configured to apply a plurality of blurring processes to the object image acquired to reduce difference between brightness of the object and brightness of a part other than the object in the object image while changing a degree of blurring in each blurring process so as to generate a plurality of background component images corresponding to different degrees of blurring based on extraction of distribution of brightness components of a background from the object image; a selector configured to select one of the background component images based on index values that indicate the degrees of blurring and are obtained based on the plurality of background component images generated by the background generator; and an image corrector configured to correct, based on the object image and the background component image selected, the object image to reduce brightness unevenness so as to generate a corrected object image.

What is claimed is:

1. An image correction method comprising:

an image acquisition step of acquiring an object image including an object to be observed;

a background generation step of applying a plurality of blurring processes to the object image acquired to reduce difference between brightness of the object and brightness of a part other than the object in the object image while changing a degree of blurring in each blurring process so as to generate a plurality of background component images corresponding to different degrees of blurring based on extraction of distribution of brightness components of a background from the object image;

a selection step of selecting one of the background component images based on index values that indicate the degrees of blurring and are obtained based on the plurality of background component images generated in the background generation step; and an image correction step of correcting, based on the object image and the background component image selected, the object image to reduce brightness unevenness so as to generate a corrected object image, wherein the index values are acquired based on brightness values of the plurality of background component images; and the selection step selects one of the background component images whose index value is smaller than a predetermined threshold in the plurality of background component images generated in the background generation step.

2. The image correction method according to claim 1, wherein the selection step selects, if two or more of the index values are smaller than the predetermined threshold, one of the background component images whose index value is the greatest value in the two or more background component images whose index values are smaller than the predetermined threshold and that are generated in the background generation step.

3. The image correction method according to claim 1, wherein the selection step generates difference images of brightness values based on two background component images whose degrees of blurring are close to each other in the plurality of background component images corresponding to the different degrees of blurring, acquires difference values as the index values based on the difference images, and selects one of the background component images that is used to generate the difference image whose difference value is smaller than a predetermined difference value threshold.

4. The image correction method according to claim 1, wherein the selection step acquires derivative values as the index values based on brightness values of the plurality of background component images corresponding to the different degrees of blurring, and selects one of the background component images whose derivative value is smaller than a predetermined derivative value threshold.

5. The image correction method according to claim 1, wherein the selection step acquires standard deviations as the index values based on brightness values of the plurality of background component images corresponding to the different degrees of blurring, and selects one of the background component images whose standard deviation is smaller than a predetermined standard deviation threshold.

6. The image correction method according to claim 1, wherein the selection step applies Fourier transform to the plurality of background component images corresponding to the different degrees of blurring so as to generate power spectrum images representing intensities of spectrums based on frequency components, acquires specific values that are averages of brightness values in a specific frequency of the power spectrum images as the index values, and selects one of the background component images that is used to generate the power spectrum image whose specific value is smaller than a predetermined specific value threshold.

7. The image correction method according to claim 1, wherein the blurring processes are filtering processes of applying a filter to the object image for correction of the object image, and the plurality of background component images corresponding to different degrees of blurring are generated by a plurality of changes of a filter size for changing the degree of blurring.

8. The image correction method according to claim 7, wherein the filter used in the background generation step is a median filter, and the plurality of background component images are generated by extracting the background component images from the object image by using the median filter.

9. An image correction apparatus comprising:

an image acquirer configured to acquire an object image including an object to be observed;

a background generator configured to apply a plurality of blurring processes to the object image acquired to reduce difference between brightness of the object and brightness of a part other than the object in the object image while changing a degree of blurring in each blurring process so as to generate a plurality of background component images corresponding to different degrees of blurring based on extraction of distribution of brightness components of a background from the object image;

a selector configured to select one of the background component images based on index values that indicate the degrees of blurring and are obtained based on the plurality of background component images generated by the background generator; and an image corrector configured to correct, based on the object image and the background component image selected, the object image to reduce brightness unevenness so as to generate a corrected object image, wherein the index values are acquired based on brightness values of the plurality of background component images; and the selector selects one of the background component images whose index value is smaller than a predetermined threshold in the plurality of background component images generated by the background generator.

* * * * *